United States Patent
Kundu (10) Patent No.: US 9,424,311 B2
(45) Date of Patent: Aug. 23, 2016

(54) QUERY ROUTING BASED ON COMPLEXITY CLASS DETERMINATION

(71) Applicant: International Business Machines Corporation, Armonk, NY (US)

(72) Inventor: Ashish Kundu, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 258 days.

(21) Appl. No.: 14/220,172

(22) Filed: Mar. 20, 2014

(65) Prior Publication Data

US 2015/0269224 A1    Sep. 24, 2015

(51) Int. Cl.
*G06F 17/30*    (2006.01)

(52) U.S. Cl.
CPC .... *G06F 17/30463* (2013.01); *G06F 17/30477* (2013.01)

(58) Field of Classification Search
None
See application file for complete search history.

(56) References Cited

U.S. PATENT DOCUMENTS

| | | |
|---|---|---|
| 5,671,403 A | 9/1997 | Shekita et al. |
| 5,778,364 A | 7/1998 | Nelson |
| 2009/0106227 A1 * | 4/2009 | Davis .................. G06Q 10/06 |
| 2010/0250519 A1 * | 9/2010 | Fiebig .............. G06F 17/30935 707/718 |
| 2011/0231428 A1 | 9/2011 | Kuramura |
| 2011/0258179 A1 * | 10/2011 | Weissman ......... G06F 17/30389 707/714 |
| 2013/0151491 A1 * | 6/2013 | Gislason ........... G06F 17/30339 707/696 |
| 2013/0151504 A1 * | 6/2013 | Konig ............... G06F 17/30424 707/718 |
| 2014/0156636 A1 * | 6/2014 | Bellamkonda .... G06F 17/30489 707/718 |
| 2014/0280036 A1 * | 9/2014 | Korlapati .......... G06F 17/30463 707/718 |
| 2015/0293512 A1 * | 10/2015 | Egge .................. G06F 17/5036 703/2 |

* cited by examiner

*Primary Examiner* — Wilson Lee
(74) *Attorney, Agent, or Firm* — Yee & Associates, P.C.; Louis Percello (57) ABSTRACT

A computer implemented method, computer system, and computer program product performs a query on a relational database. When a query is received, a corresponding complexity class is determined for the query. The query is routed to a corresponding query processor based on the corresponding complexity class determined for the submitted query. The query is executed on the corresponding query processor according to a determined execution plan.

15 Claims, 4 Drawing Sheets

QUERY ROUTING BASED ON COMPLEXITY CLASS DETERMINATION

BACKGROUND

1. Field

The disclosure relates generally to a computer implemented method, a data processing system, and a computer program product for query processing in a relational database. More specifically, the disclosure relates to a computer implemented method, a data processing system, and a computer program product for query routing among a plurality of query processors based on a determined complexity class of the query.

2. Description of the Related Art

Databases are used to store information for an innumerable number of applications, including various commercial, industrial, technical, scientific, and educational applications. As the reliance on information increases, both the volume of information stored in most databases, as well as the number of users wishing to access that information, likewise increases. Moreover, as the volume of information in a database, and the number of users wishing to access the database, increases, the amount of computing resources required to manage such a database increases as well.

Database management systems (DBMS's), which are the computer programs that are used to access the information stored in databases, therefore often require tremendous resources to handle the heavy workloads placed on such systems. As such, significant resources have been devoted to increasing the performance of database management systems with respect to processing searches, or queries, to databases.

Improvements to both computer hardware and software have improved the capacities of conventional database management systems. For example, in the hardware realm, increases in microprocessor performance, coupled with improved memory management systems, have improved the number of queries that a particular microprocessor can perform in a given unit of time. Furthermore, the use of multiple microprocessors and/or multiple networked computers has further increased the capacities of many database management systems.

From a software standpoint, the use of relational databases, which organize information into formally-defined tables consisting of rows and columns, and which are typically accessed using a standardized language such as Structured Query Language (SQL), has substantially improved processing efficiency, as well as substantially simplified the creation, organization, and extension of information within a database.

In a publish-subscribe model, database queries typically return only a subset of the total database entries. The process of selecting messages for reception and processing is called filtering. Database entries are only returned if the attributes or content of those entries match constraints defined by the user in the query. Significant development efforts have been directed toward query optimization, whereby the execution of particular searches, or queries, is optimized in an automated manner to minimize the amount of resources required to execute each query.

Through the incorporation of various hardware and software improvements, many high performance database management systems are able to handle hundreds or even thousands of queries each second, even on databases containing millions or billions of records. However, further increases in information volume and workload are inevitable, so continued advancements in database management systems are still required.

One area that has been a fertile area for academic and corporate research is that of improving the designs of the query optimizers utilized in many conventional database management systems. The primary task of a query optimizer is to choose the most efficient way to execute each database query, or request, passed to the database management system by a user. The output of an optimization process is typically referred to as an "execution plan," "access plan," or just "plan" and is frequently depicted as a tree graph. Such a plan typically incorporates (often in a proprietary form unique to each optimizer/DBMS) low-level information telling the database engine that ultimately handles a query precisely what steps to take (and in what order) to execute the query. Also typically associated with each generated plan is an optimizer's estimate of how long it will take to run the query using that plan.

An optimizer's job is often necessary and difficult because of the enormous number (i.e., "countably infinite" number) of possible query forms that can be generated in a database management system, e.g., due to factors such as the use of SQL queries with any number of relational tables made up of countless data columns of various types, the theoretically infinite number of methods of accessing the actual data records from each table referenced (e.g., using an index, a hash table, etc.), and the possible combinations of those methods of access among all the tables referenced, etc. An optimizer is often permitted to rewrite a query (or portion of it) into any equivalent form, and since for any given query there are typically many equivalent forms, an optimizer has a countably infinite universe of extremely diverse possible solutions (plans) to consider. On the other hand, an optimizer is often required to use minimal system resources given the desirability for high throughput. As such, an optimizer often has only a limited amount of time to pare the search space of possible execution plans down to an optimal plan for a particular query.

Another automated tool that is a part of many database management systems is a database monitor. It is used to gather performance statistics related to SQL queries run within the database management system. The data collected by the database monitor is typically collected in a database file itself where it can be queried by a trained user to help identify and tune performance problem areas. A database monitor typically tracks the name of a query, the name of the tables accessed by the query, the indices used by the query (if any), the join parameters of the query, and other pertinent information such as the duration of time the query took to complete. The performance statistics collected by a database monitor are typically large in volume and require a knowledgeable SQL administrator to interpret and use.

Typical query optimizers store information about previously encountered queries and the access plans that were created for such queries. When a previous query is once again encountered, these optimizers use previous access plans to avoid the time and cost of re-creating an access plan regardless of how the earlier access plan performed.

Federated query optimizers often deploy cost-based query optimization mechanisms. Specifically, these optimizers can determine multiple global query execution plans and, then, select the execution plan with the lowest execution cost. Thus, cost functions indirectly influence what remote sources are accessed to retrieve data and how federated queries are processed.

SUMMARY

According to an illustrative embodiment of the present invention, a computer implemented method is provided to determine a query execution plan for a given query using Dynamic complexity of graph problems. The computer implemented method makes a determination of subqueries and which algorithms to be used to evaluate them. A publish/subscribe system is used to process subqueries by routing subqueries to the respective query processing engines based on complexity of the subquery. The computer implemented method then uses a correctness estimate, probability of termination of query processing, and size of query result, towards determining the query plan to determine whether the query should be executed. The computer implemented method can then ask the user whether to continue with query processing after providing information about "correctness estimate," probability of termination of query processing, and size of query result, towards determining the query plan. The computer implemented method thus provides distributed query processing for graph databases based on complexity of subqueries.

According to an illustrative embodiment of the present invention, a computer program product on a computer readable storage medium is provided to determine a query execution plan for a given query using Dynamic complexity of graph problems. The computer program product includes instructions to make a determination of subqueries and which algorithms to be used to evaluate them. A publish/subscribe system is used to process subqueries by routing subqueries to the respective query processing engines based on complexity of the subquery. The computer program product includes instructions to use a correctness estimate, probability of termination of query processing, and size of query result, towards determining the query plan to determine whether the query should be executed. The computer program product includes instructions to ask the user whether to continue with query processing after providing information about "correctness estimate," probability of termination of query processing, and size of query result, towards determining the query plan. The computer program product thus provides distributed query processing for graph databases based on complexity of subqueries.

According to an illustrative embodiment of the present invention, a computer system is provided for determining a query execution plan for a given query using Dynamic complexity of graph problems. The computer system includes storage having a computer program product stored thereon, a bus system, and at least one processor. When the computer program product is executed by the processor, the computer system makes a determination of subqueries and which algorithms to be used to evaluate them. A publish/subscribe system is used to process subqueries by routing subqueries to the respective query processing engines based on complexity of the subquery. The computer system then uses a correctness estimate, probability of termination of query processing, and size of query result, towards determining the query plan to determine whether the query should be executed. The computer system can then ask the user whether to continue with query processing after providing information about "correctness estimate", probability of termination of query processing, and size of query result, towards determining the query plan. The computer system thus provides distributed query processing for graph databases based on complexity of subqueries.

DETAILED DESCRIPTION

The present invention may be a system, a method, and/or a computer program product. The computer program product may include a computer readable storage medium (or media) having computer readable program instructions thereon for causing a processor to carry out aspects of the present invention.

Any combination of one or more computer readable medium(s) may be utilized. The computer readable medium(s) may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
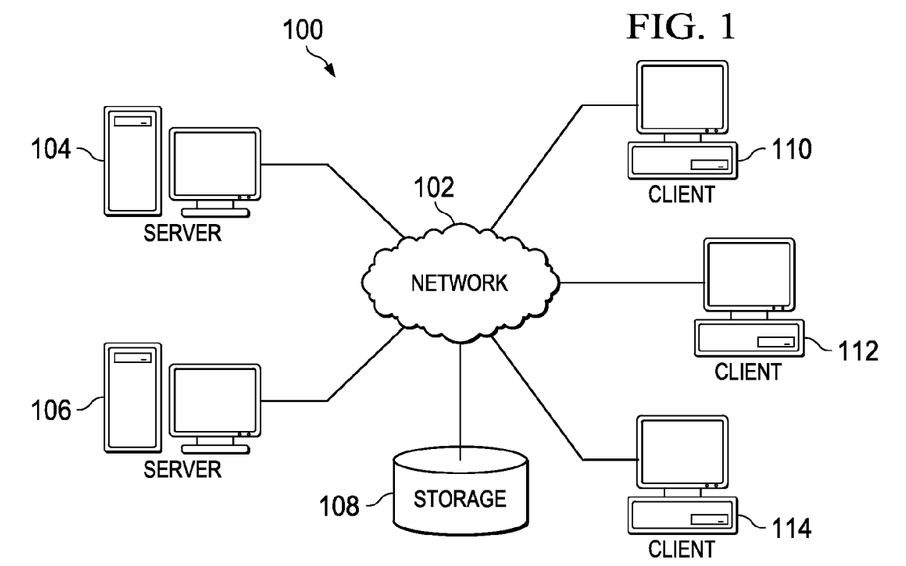
FIG. 1 is an illustrative diagram of a data processing environment in which illustrative embodiments may be implemented.

With reference now to the figures and, in particular, with reference to FIG. 1, an illustrative diagram of a data processing environment is provided in which illustrative embodiments may be implemented. It should be appreciated that FIG. 1 is only provided as an illustration of one implementation and is not intended to imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client computers 110, 112, and 114 connect to network 102. Client computers 110, 112, and 114 may be, for example, personal computers or network computers. In the depicted example, server computer 104 provides information, such as boot files, operating system images, and applications to client computers 110, 112, and 114. Client computers 110, 112, and 114 are clients to server computer 104 in this example. Network data processing system 100 may include additional server computers, client computers, and other devices not shown.

Program code located in network data processing system 100 may be stored on a computer recordable storage medium and downloaded to a data processing system or other device for use. For example, program code may be stored on a computer recordable storage medium on server computer 104 and downloaded to client computer 110 over network 102 for use on client computer 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented as a number of different types of networks, such as, for example, an intranet, a local area network (LAN), or a wide area network (WAN). FIG. 1 is intended as an example, and not as an architectural limitation for the different illustrative embodiments.

Figure 2:
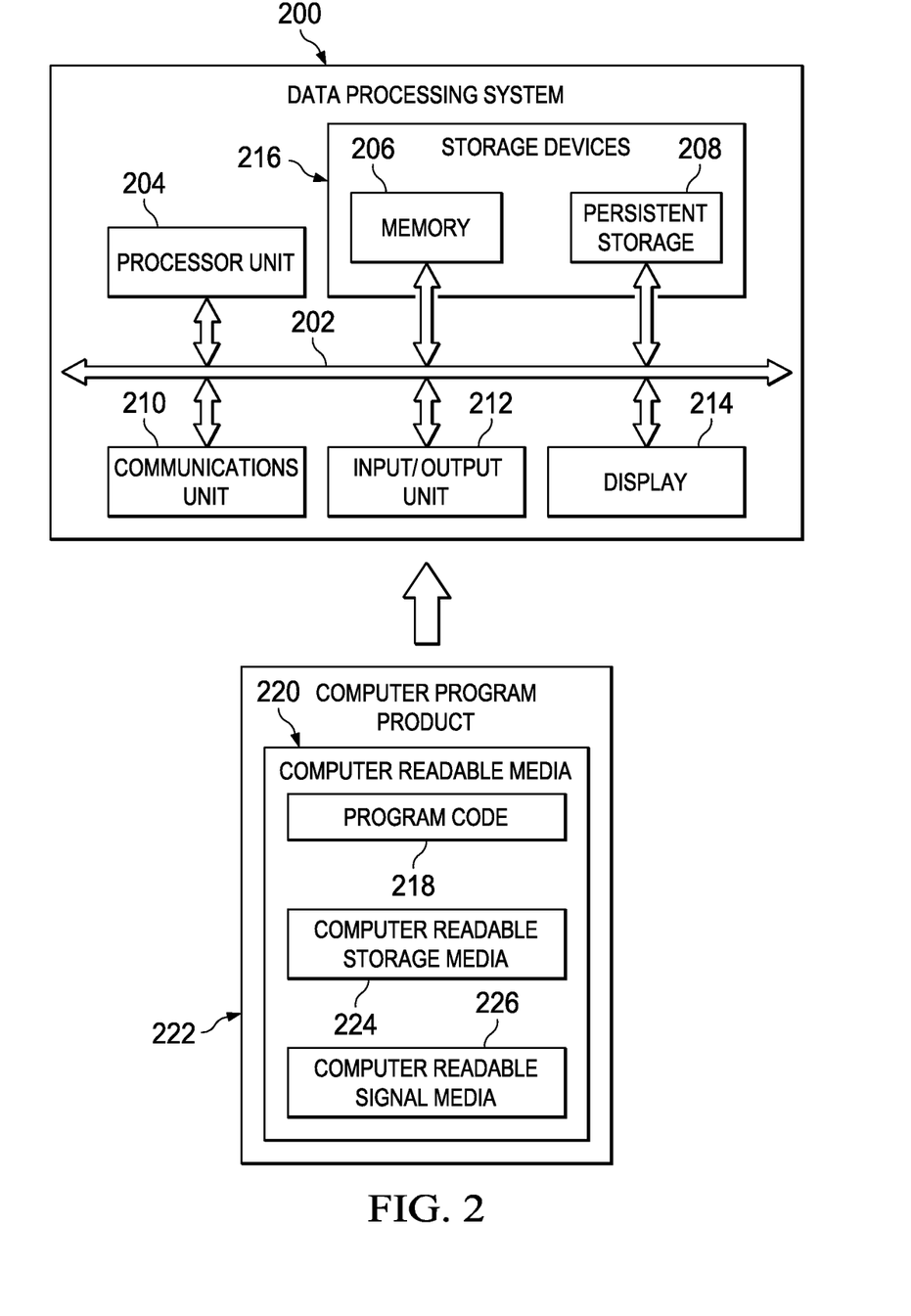
FIG. 2 is an illustration of a data processing system depicted in accordance with an illustrative embodiment.

Turning now to FIG. 2, an illustration of a data processing system is depicted in accordance with an illustrative embodiment. Data processing system 200 may be used to implement a query processing system with a relational database, such as relational database 300 of FIG. 3. In this illustrative example, data processing system 200 includes communications framework 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a number of processors, a multi-processor core, or some other type of processor, depending on the particular implementation. A number, as used herein with reference to an item, means one or more items. Further, processor unit 204 may be implemented using a number of heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, program code in functional form, and/or other suitable information either on a temporary basis and/or a permanent basis. Storage devices 216 may also be referred to as computer readable storage devices in these examples. Memory 206, in these examples, may be, for example, a random access memory or any other suitable volatile or non-volatile storage device. Persistent storage 208 may take various forms, depending on the particular implementation.

For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either, or both, physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications framework 202. In these illustrative examples, the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code in the different embodiments may be embodied on different physical or computer readable storage media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be computer readable storage media 224 or computer readable signal media 226. Computer readable storage media 224 may include, for example, an optical or magnetic disk that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory, that is connected to data processing system 200. In some instances, computer readable storage media 224 may not be removable from data processing system 200. In these examples, computer readable storage media 224 is a physical or tangible storage device used to store program code 218 rather than a medium that propagates or transmits program code 218. Computer readable storage media 224 is also referred to as a computer readable tangible storage device or a computer readable physical storage device. In other words, computer readable storage media 224 is a media that can be touched by a person.

Alternatively, program code 218 may be transferred to data processing system 200 using computer readable signal media 226. Computer readable signal media 226 may be, for example, a propagated data signal containing program code 218. For example, computer readable signal media 226 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 218 may be downloaded over a network to persistent storage 208 from another device or data processing system through computer readable signal media 226 for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 204 may take the form of a hardware unit that has circuits that are manufactured or configured for a particular use. This type of hardware may perform operations without needing program code to be loaded into a memory from a storage device to be configured to perform the operations.

For example, when processor unit 204 takes the form of a hardware unit, processor unit 204 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 218 may be omitted because the processes for the different embodiments are implemented in a hardware unit.

In still another illustrative example, processor unit 204 may be implemented using a combination of processors found in computers and hardware units. Processor unit 204 may have a number of hardware units and a number of processors that are configured to run program code 218. With this depicted example, some of the processes may be implemented in the number of hardware units, while other processes may be implemented in the number of processors.

In another example, a bus system may be used to implement communications framework 202 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of more devices that transmit data, receive data, or transmit and receive data. A communications unit may be, for example, a modem or a network adapter, two network adapters, or some combination thereof. Further, a memory may be, for example, memory 206, or a cache, such as that which is found in an interface and memory controller hub that may be present in communications framework 202.

Illustrative embodiments of the present invention provide a computer implemented method, computer system, and computer program product for performing a query on a relational database. When a query is received, a corresponding complexity class is determined for the query. The query is routed to a corresponding query processor based on the corresponding complexity class determined for the submitted query. The query is executed on the corresponding query processor according to a determined execution plan.

Figure 3:
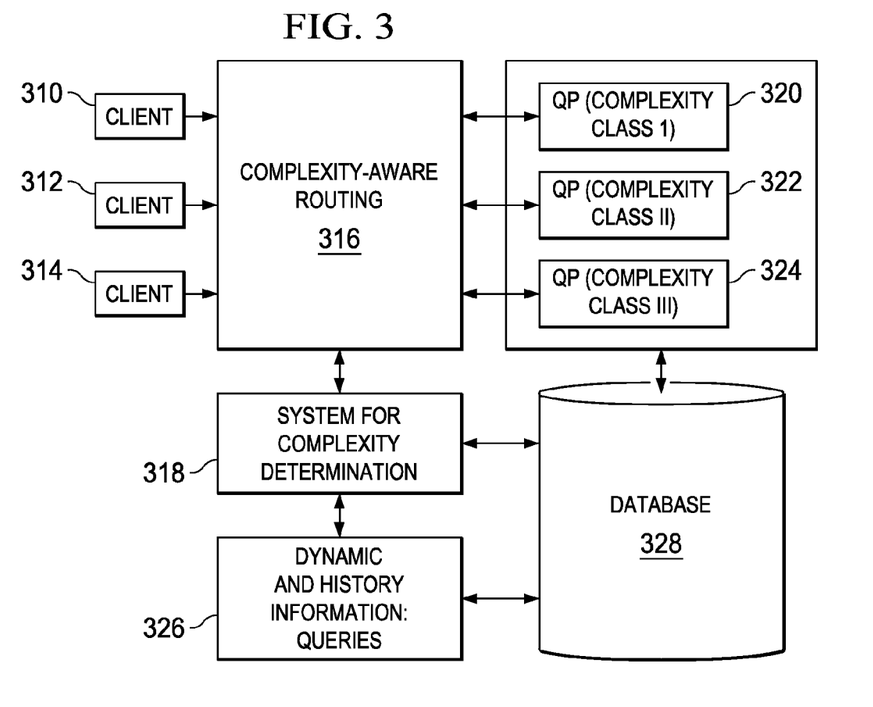
FIG. 3 is a query processing system shown in accordance with an illustrative embodiment.

Referring now to FIG. 3, a query processing system is shown in accordance with an illustrative embodiment. Query processing system 300 can be executed on a data processing system, such as data processing system 200 of FIG. 2.

Query processing system 300 includes client 310, client 312, and client 314. Each of client 310, client 312, and client 314 is a client such as one of client computers 110, 112, and 114 of FIG. 1.

Complexity aware routing 316 is a software component that receives queries from client 310, client 312, or client 314, and routes those queries to one of a plurality of query processors. Complexity aware routing 316 performs query optimization on queries received from client 310, client 312, and client 314. Query optimization is the process of choosing the fastest execution plan. In the optimization phase, the query processor chooses:

Which, if any, indexes to use;
The order in which joins are executed;
The order in which constraints such as WHERE clauses are applied; and
Which algorithms are likely to lead to the best performance, based on cost information derived from statistics.

That is, query optimization, in part, determines the complexity class for the submitted query.

A cost-based query optimizer chooses among alternative plans to answer an SQL query. Selection is based on cost estimates for different plans. The factors in making cost estimates include the number of I/O operations, the amount of CPU time, and so on. A cost-based query optimizer estimates these costs by keeping statistics about the number and composition of records in a table or index and is not dependent on the exact syntax of the query or the order of clauses within the query (unlike a syntax-based query optimizer).

In determining to which of the query processors the query should be routed, complexity aware routing 316 takes into account the complexity class for the query. System for complexity determination 318 is a software component for determining the complexity class of queries submitted to query processing system 300.

Typically, a complexity class is defined by (1) a model of computation, (2) a resource (or collection of resources), and (3) a function known as the complexity bound for each resource. The models used to define complexity classes fall into two main categories: (a) machine based models, such as Turning machines, and (b) circuit-based models.

The following are examples of the more common complexity classes:

The polynomial time complexity class contains all decision problems that can be solved by a deterministic Turing machine using a polynomial amount of computation time, or polynomial time. The Polynomial time complexity class is represented by the formula:

$$P = D\text{Time}[n^{O(1)}] = \bigcup_{k \geq 1} D\text{Time}[n^k]$$

Wherein:
DTime[t(n)] is the class of decision problems decided by a deterministic Turing machine of time complexity t(n).

The nondeterministic polynomial time complexity class contains all decision problems for which the instances where the answer is "yes" have efficiently verifiable proofs of the fact that the answer is indeed "yes." More precisely, these proofs have to be verifiable in polynomial time by a deterministic Turing machine. The nondeterministic polynomial time complexity class is represented by the formula:

$$NP = N\text{Time}[n^{O(1)}] = \bigcup_{k \geq 1} N\text{Time}[n^k]$$

As a subset of The nondeterministic polynomial time complexity class, Non-deterministic Polynomial-time hard (NP-hard), is a class of problems that are, informally, "at least as hard as the hardest problems in NP." A problem H is NP-hard if, and only if, there is an NP-complete problem L that is polynomial time Turing-reducible to H (i.e., $L \leq_T H$). In other words, L can be solved in polynomial time by an oracle machine with an oracle for H.

The exponential time complexity class contains all decision problems solvable by a deterministic Turing machine in $O(2^{p(n)})$ time, where p(n) is a polynomial function of n. The exponential time complexity class is represented by the formula:

$$EXP = D\text{Time}[2^{n^{O(1)}}] = \bigcup_{k \geq 1} D\text{Time}[2^{n^k}]$$

The nondeterministic exponential time complexity class contains all decision problems that can be solved by a non-deterministic Turing machine using time $O(2^{p(n)})$ for some polynomial p(n), and unlimited space. The nondeterministic exponential time complexity class is represented by the formula:

$$EXP = N\text{Time}[2^{n^{O(1)}}] = \bigcup_{k \geq 1} N\text{Time}[2^{n^k}]$$

Complexity aware routing 316 takes into account both static complexity and Dynamic complexity when routing the query to an appropriate query processor. Static complexity is the complexity inherent to the query based on the complexity of the queried databases. The complexity of the queried databases can in turn be based on the types of graphs in the database, such as, for example, but not limited to, a tree, a directed acyclic graph (DAG), cyclic graphs, and planar graphs. The complexity of the queried databases can also depend on whether the database has been updated.

In one illustrative embodiment, static query complexity also depends on what kinds of statements are used in the subqueries into which the query is decomposed. For example, for a sequence of statements such as:

statement 1;
statement 2;
...
statement k;

The total time is found by adding the times for all statements. If each statement involves only basic operations, then the time for each statement is constant. Query complexity for such a statement is polynomial.

In one illustrative embodiment, the subqueries can include if-then-else statements such as the following:

```
if (condition) {
    sequence of statements 1
}
else {
    sequence of statements 2
}
```

In such embodiments, either sequence 1 will execute, or sequence 2 will execute. If each sequence involves only basic operations, then the time for each sequence is constant. Query complexity for such a statement is polynomial. However, if one or more of the sequences involve non-basic operations, the worst-case time is the slowest of the two possibilities: max(time(sequence 1), time(sequence 2)). This worst-case scenario may include nondeterministic polynomial, or exponential complexities.

In one illustrative embodiment, the subqueries can include for-loop statements such as the following:

```
for (i = 0; i < N; i++) {
    sequence of statements
}
```

The loop executes N times, so the sequence of statements also executes N times. If each sequence involves only basic operations, Query complexity for such a statement is polynomial.

In one illustrative embodiment, the subqueries can include nested for-loop statements such as the following:

```
for (i = 0; i < N; i++) {
    for (j = 0; j < M; j++) {
        sequence of statements
    }
}
```

The outer loop executes N times. For each time the outer loop executes, the inner loop executes M times. As a result, the statements in the inner loop execute a total of N*M times. Thus, the complexity is O(N*M). In a common special case where the stopping condition of the inner loop is j<N instead of j<M (i.e., the inner loop also executes N times), the total complexity for the two loops is $O(N^2)$, or nondeterministic polynomial time complexity class.

Dynamic query complexity alters the static query complexity based on other queries processed earlier, being processed or to be processed concurrently or ahead of this current query. For example, if an identical statement has been received earlier, the server retrieves the results from that query rather than parsing and executing the statement again. In one illustrative embodiment, query results are shared among sessions, so a result set generated by one client, such as client 310, can be sent in response to the same query issued by another client, such as client 312.

Query optimization is the process of choosing the fastest execution plan. In the optimization phase, the query processor chooses, for example:
  which, if any, indices to use;
  the order in which joins are executed;
  the order in which constraints such as WHERE clauses are applied; and
  which algorithms are likely to lead to the best performance, based on cost information derived from statistics.

That is, query optimization in part determines the complexity class for the submitted query.

Query execution is the process of executing the plan chosen during query optimization. The query execution component also determines the techniques available to the query optimizer. For example, SQL Server implements a hash join algorithm and a merge join algorithm, both of which are available to the query optimizer. The objective is to execute the plan quickly by returning the answer to the user (or more often, the program run by the user) in the least amount of time. This is not the same as executing the plan with the fewest resources (CPU, I/O, and memory). For example, a parallel query almost always uses more resources than a nonparallel query, but it is often desirable because it returns the result more quickly.

Query execution is presented before query optimization because the set of available execution techniques determines the set of choices available to the optimizer. The techniques include disk I/O, sorting, join and hash operations, index intersections, index joins, and parallelism.

Query processor 320 is a query processor that performs query execution for a given complexity class. For example, query processor 320 may execute queries that are determined by System for complexity determination 318 to be of a class polynomial time (P).

Query processor 322 is a query processor that performs query execution for a given complexity class. For example, query processor 322 may execute queries that are determined by System for complexity determination 318 to be of a class non-deterministic polynomial time (NP).

Query processor 324 is a query processor that performs query execution for a given complexity class. For example, query processor 324 may execute queries that are determined by System for complexity determination 318 to be of a class non-deterministic polynomial hard time (NP-hard).

Dynamic and history information 326 is a data store containing saved history of search queries. The syntax of research, as well as any determination of the complexity class, can be retrieved for future searches and complexity determinations.

Dynamic and history information 326 provides a general record of operations performed by the relational database 300. Database 328 writes information to Dynamic and history information 326 when one of clients 310, 312, or 314 connects or disconnects. Dynamic and history information 326 logs each query statement received from clients 310, 312, and 314. If an identical statement is received later, the server retrieves the results from Dynamic and history information 326 rather than parsing and executing the statement again. In one illustrative embodiment, Dynamic and history information 326 is shared among sessions, so a result set generated by one client, such as client 310, can be sent in response to the same query issued by another client, such as client 312.

Database 328 comprises a storage engine that writes data to and reads data from the disk. Database 328 manages records, controls concurrency, and maintains log files.

Figure 4:
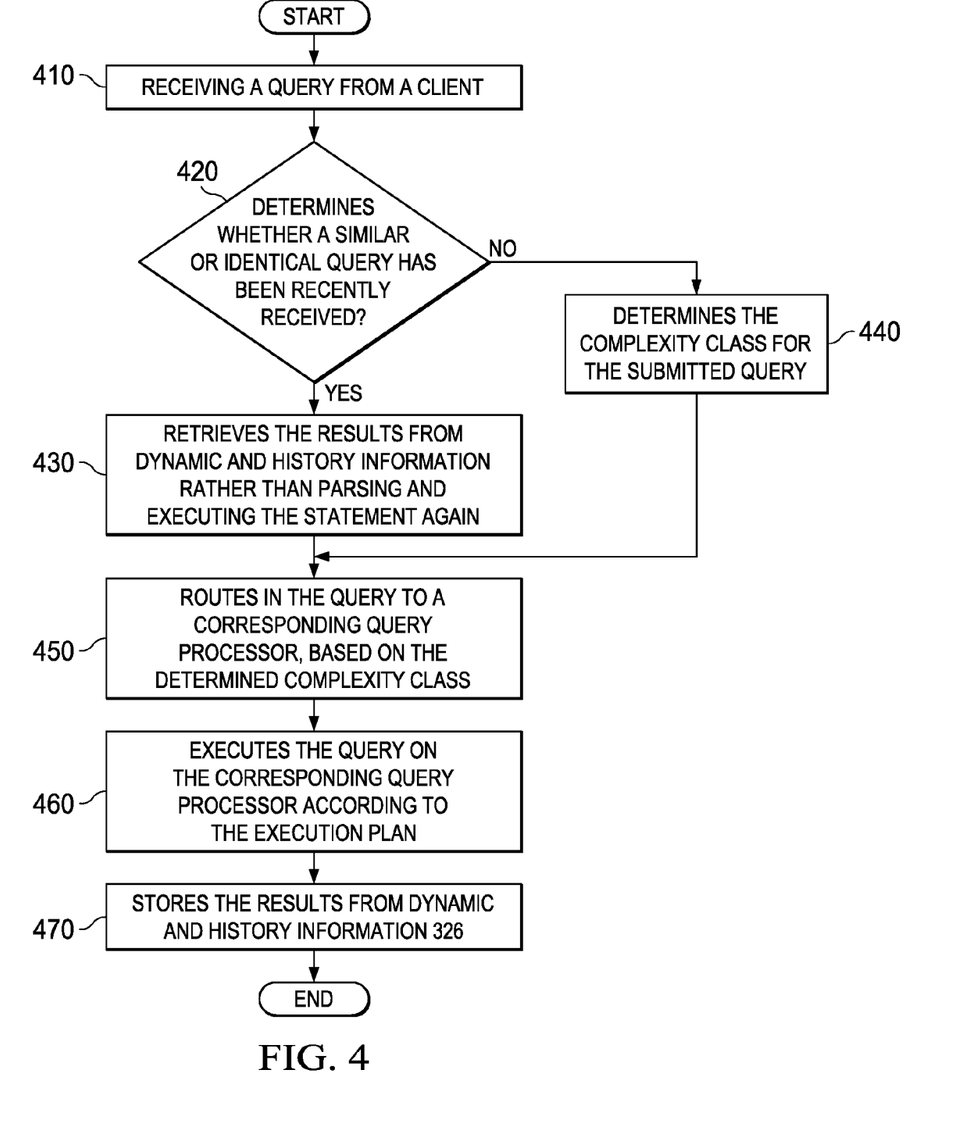
FIG. 4 is a flowchart of a process for performing a query on a relational database shown according to an illustrative embodiment.

Referring now to FIG. 4, a flowchart of a process for performing a query on a relational database is shown according to an illustrative embodiment. Process 400 is a software process executing on one or more software components of a relational database, such as relational database 300 of FIG. 3.

Process 400 begins by receiving a query from a client (step 410). The client can be, for example one of client 310, client 312, or client 314 of FIG. 1.

Responsive to receiving a query, process 400 determines whether a similar or identical query has been recently received (step 420). Process 400 determines whether a similar or identical query has been received by examining Dynamic and history information, such as Dynamic and history information 326 of FIG. 3. Dynamic and history information provides a general record of operations performed by the relational database 300. Database 328 writes information to Dynamic and history information 326 when one of client 310, client 312, or client 314 connects or disconnects. Dynamic and history information 326 logs each query statement received from client 310, client 312, and client 314. Responsive to a similar or identical query having been recently received ("yes" at step 420), process 400 retrieves the results from Dynamic and history information 326 rather than parsing and executing the statement again (step 430). In one illustrative embodiment, Dynamic and history information 326 is shared among sessions, so a result set generated by one client, such as client 310, can be sent in response to the same query issued by another client, such as client 312.

Responsive to a similar or identical query not having been recently received ("no" at step 420), process 400 determines the complexity class for the submitted query (step 440). As discussed above, the complexity class of the submitted query can be determined in part based on the query optimization.

Process 400 routes the query to a corresponding query processor based on the determined complexity class (step 450). The query processors can be, for example one of query processor 320, query processor 322, or query processor 324 of FIG. 3.

Process 400 executes the query on the corresponding query processor according to the execution plan (step 460). Process 400 stores the results from Dynamic and history information 326 (step 470), with the process terminating thereafter. In one illustrative embodiment, Dynamic and history information 326 is shared among sessions, so a result set generated by one client, such as client 310, can be sent in response to the same query issued by another client, such as client 312.

Figure 5:
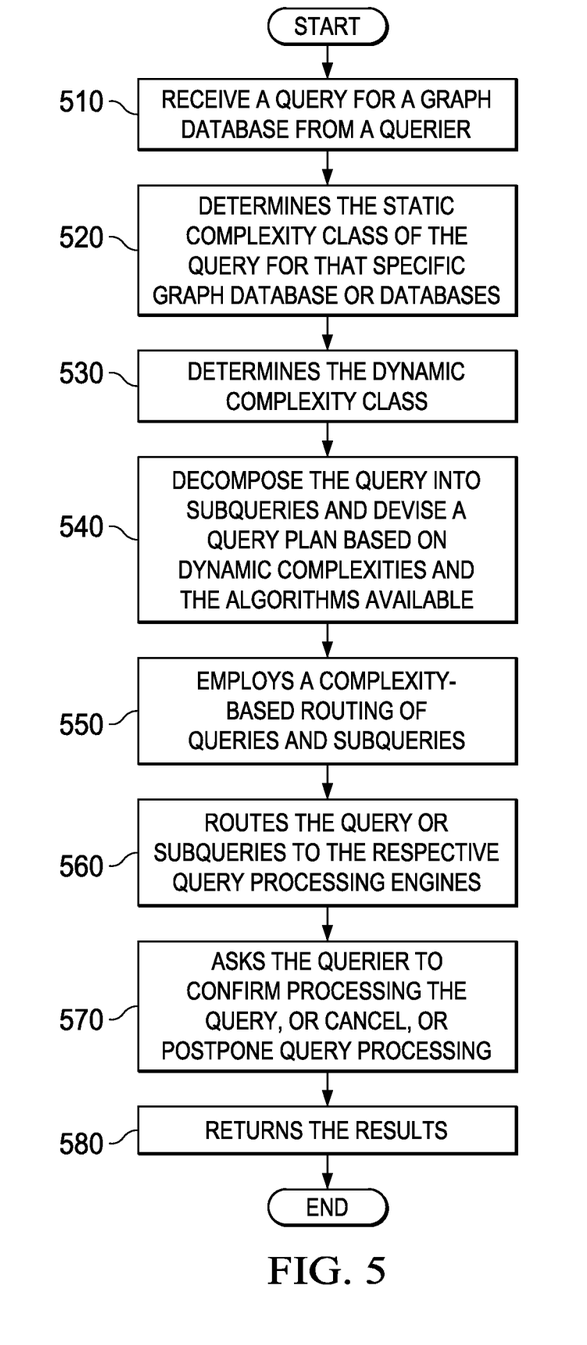
FIG. 5 is a process for routing queries according to a determined complexity class shown according to an illustrative embodiment.

Referring now to FIG. 5, a process for routing queries according to a determined complexity class is shown according to an illustrative embodiment. Process 500 is a software process executing on software components of a relational database system, such as relational database 300 of FIG. 3.

Process 500 begins by receiving a query for a graph database from a querier (step 510). The querier can be, for example one of client 310, client 312, or client 314 of FIG. 3.

Responsive to receiving the query, process 500 determines the static complexity class of the query for that specific graph database or databases (step 520). Static complexity is the complexity inherent to the query based on the complexity of the queried databases. The complexity of the queried databases can in turn be based on the types of graphs in the database, such as, for example, but not limited to, a tree, a directed acyclic graph (DAG), cyclic graphs, and planar graphs.

Responsive to determining the static complexity class for the query, process 500 determines the Dynamic complexity class (step 530). The Dynamic complexity class of the query can be based on the static complexity, other queries processed earlier, being processed, or to be processed concurrently or ahead of the query.

Responsive to determining Dynamic complexity for the query, process 500 decomposes the query into subqueries and devises a query plan based on Dynamic complexities and the algorithms available (step 540). The query is decomposed into subqueries such that some of the subqueries are solvable in polynomial time, and the other ones may not be solvable in polynomial time. The query is decomposed with a goal to optimize some or all the following criteria:

time taken to process the query and send a result;
size of the result;
how correct the result is (0 to 1);
what is the probability that the query would at all be processed by the server within the required time; and
what is the probability that the query would not be terminated before it is completely processed.

As part of devising the query plan, process 500 estimates complexities of the subqueries and query from the complexity databases. In an illustrative embodiment, process 500 can estimate the complexities of the subqueries based on the types of graphs in the database tree, such as for example, DAG, cyclic graphs, planar graphs, and whether the database has been updated If the database has been updated such that the number of graphs, size of graphs, properties of graphs have changed, process 500 then evaluates how such changes affect the complexity of the query. If the complexity of the query is affected, then re-decompose subqueries.

Optionally, the decomposer determines if a similar query has been received within a predetermined period of time. If yes, then if there has been less than a predetermined number of updates to the database within delta 1 time period and the processing of the query or some subqueries has been completed, process 500 can re-use those results. If no decomposition is carried out within the predetermined time or the databases have been updated more than the predetermined amount, process 500 can continue decomposition and processing.

As part of determining the available algorithms, process 500 determines the algorithms from a database of algorithms. In one illustrative embodiment, process 500 makes this determination based on the subquery the algorithm solve, whether the algorithm's implementation in the database system supports certain correctness estimates, an estimate of probability of completion of the subquery, whether concurrent processing of the algorithm is allowed, whether the algorithm supports incremental evaluation of queries (on incremental changes), and whether the algorithm offers an optimal solution.

Process 500 then employs a complexity-based routing of queries and subqueries (step 550), utilizing complexity of a subquery in the routing parameter.

Process 500 routes the query or subqueries to the respective query processing engines (step 560). The respective query processing engines implement the algorithms based on how much time the subquery is estimated to take, and other criteria mentioned above.

Process 500 asks the querier to confirm processing the query, cancel, or postpone query-processing (step 570). Confirmation of processing can be based on the values optimized upon, for example but not limited to, correctness, time to process, probability of termination (some other maybe included), and size of the query results.

Once the query is processed, process 500 returns the results (step 580). Process 500 terminates thereafter.

Thus, illustrative embodiments of the present invention provide a computer implemented method, computer system, and computer program product for performing a query on a relational database. When a query is received, a corresponding complexity class is determined for the query. The query is routed to a corresponding query processor based on the corresponding complexity class determined for the submitted query. The query is executed on the corresponding query processor according to a determined execution plan.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to explain best the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer implemented method for performing a query on a relational database, the computer implemented method comprising:
   receiving, by a computer, a query;
   determining, by the computer, a corresponding complexity class of a plurality of complexity classes for the query by determining a static complexity class for the query and by determining dynamic complexity classes for the query;
   decomposing the query into sub queries;
   devising a query execution plan using the dynamic complexity classes determined and algorithms available to a plurality of query processors;
   routing, by the computer, the decomposed query to corresponding query processors of the plurality of query processors based on the corresponding complexity class determined for the received query; and
   executing, by the computer, the decomposed query on the corresponding query processors according to a devised execution plan.

2. The computer implemented method of claim 1, wherein devising the query execution plan further comprises:
   estimating complexity of the sub queries and the query based on updates to a complexity database and types of graphs in a database tree, wherein the types of graphs are selected from a group comprising trees, directed acyclic graphs, cyclic graphs, planar graphs, and combinations thereof.

3. The computer implemented method of claim 1, wherein the plurality of complexity classes include a polynomial time complexity class, a nondeterministic polynomial time complexity class, a nondeterministic polynomial time hard complexity class, and a nondeterministic exponential time complexity class.

4. The computer implemented method of claim 1, wherein the dynamic query complexity classes are determined from alterations of a complexity of the query based on other queries processed earlier, other queries being processed concurrently or ahead of the query, and other queries to be processed concurrently or ahead of the query.

5. The computer implemented method of claim 1, further comprising:
   storing the query, the static complexity class, and the dynamic complexity classes in a database.

6. A non-transitory computer readable storage medium having computer usable program code encoded thereon for performing a query on a relational database, the computer usable program code comprising:
   computer usable program code for receiving a query;
   computer usable program code for determining a corresponding complexity class of a plurality of complexity classes for the query, by determining a static complexity class for the query and by determining dynamic complexity classes for the query;
   computer usable program code for decomposing the query into sub queries;
   computer usable program code for devising a query execution plan using the dynamic complexity classes determined and algorithms available to a plurality of query processors;
   computer usable program code for routing the decomposed query to corresponding query processors of the plurality of query processors based on the corresponding complexity class determined for the received query; and
   computer usable program code for executing the decomposed query on the corresponding query processors according to a devised execution plan.

7. The non-transitory computer readable storage medium of claim 6, wherein the computer usable program code for devising the query execution plan further comprises:
   computer usable program code for estimating complexity of the sub queries and the query based on updates to a complexity database and types of graphs in a database tree, wherein the types of graphs are selected from a group comprising trees, directed acyclic graphs, cyclic graphs, planar graphs, and combinations thereof.

8. The non-transitory computer readable storage medium of claim 6, wherein the
   plurality of complexity classes include a polynomial time complexity class, a nondeterministic polynomial time complexity class, a nondeterministic polynomial time hard complexity class, and a nondeterministic exponential time complexity class.

9. The non-transitory computer readable storage medium of claim 6, wherein the
   dynamic query complexity classes are determined from alterations of a complexity of the query based on other queries processed earlier, other queries being processed concurrently or ahead of the query, and other queries to be processed concurrently or ahead of the query.

10. The non-transitory computer readable storage medium of claim 6, further comprising:
    computer readable program code for storing the query, the static complexity class, and the dynamic complexity classes in a database.

11. A computer system comprising:
    a memory having computer readable program code stored thereon for performing a query on a relational database;
    a bus connecting the memory to a processor; and
    a processor, wherein the processor executes the computer readable program code:
    to receive a query;
    to determine a corresponding complexity class of a plurality of complexity classes for the query by determining a static complexity class for the query and by determining dynamic complexity classes for the query;
    to decompose the query into sub queries;
    to devise a query execution plan using the dynamic complexity classes determined and algorithms available to a plurality of query processors;
    to route the decomposed query to corresponding query processors of the plurality of query processors based on the corresponding complexity class determined for the received query; and to execute the decomposed query on the corresponding query processors according to a devised execution plan.

12. The computer system of claim 11, wherein the processor executing the computer readable program code to devise the query execution plan further comprises the processor executing the computer readable program code:
to estimate complexity of the sub queries and the query based on updates to a complexity database and types of graphs in a database tree, wherein the types of graphs are selected from a group comprising trees, directed acyclic graphs, cyclic graphs, planar graphs, and combinations thereof.

13. The computer system of claim 11, wherein the plurality of complexity classes include a polynomial time complexity class, a nondeterministic polynomial time complexity class, a nondeterministic polynomial time hard complexity class, and a nondeterministic exponential time complexity class.

14. The computer system of claim 11, wherein the dynamic query complexity classes are determined from alterations of complexity of the query based on other queries processed earlier, other queries being processed concurrently or ahead of the query, and other queries to be processed concurrently or ahead of the query.

15. The computer system of claim 11, wherein the processor further executes the computer readable program code:
to store the query, the static complexity class, and the dynamic complexity classes in a database.

* * * * *